(12) United States Patent
Santini (10) Patent No.: US 10,532,804 B2
(45) Date of Patent: Jan. 14, 2020

(54) AERODYNAMIC CONTROL SURFACE AND ASSOCIATED TRAILING EDGE CLOSE-OUT METHOD

(71) Applicant: The Boeing Company, Chicago, IL (US)

(72) Inventor: Gregory M. Santini, Bothell, WA (US)

(73) Assignee: The Boeing Company, Chicago, IL (US)

( * ) Notice: Subject to any disclaimer, the term of this patent is extended or adjusted under 35 U.S.C. 154(b) by 415 days.

(21) Appl. No.: 15/427,817

(22) Filed: Feb. 8, 2017

(65) Prior Publication Data
US 2018/0222571 A1  Aug. 9, 2018

(51) Int. Cl.
| | |
|---|---|
| *B64C 9/02* | (2006.01) |
| *B64C 7/00* | (2006.01) |
| *B64C 9/16* | (2006.01) |
| *B64C 9/18* | (2006.01) |
| *B64C 9/00* | (2006.01) |

(52) U.S. Cl.
CPC .............. *B64C 9/02* (2013.01); *B64C 7/00* (2013.01); *B64C 9/16* (2013.01); *B64C 9/18* (2013.01); *B64C 2009/005* (2013.01)

(58) Field of Classification Search
CPC .... B64C 3/50; B64C 7/00; B64C 9/02; B64C 9/16; B64C 9/18; B64C 27/467; B64C 27/473; B64C 3/26; B64C 3/28; B64C 3/48
See application file for complete search history.

(56) References Cited

U.S. PATENT DOCUMENTS

| | | | | |
|---|---|---|---|---|
| 1,822,940 | A * | 9/1931 | Sundstedt | B64C 3/00 244/123.1 |
| 3,814,540 | A * | 6/1974 | Schramm | B64C 27/473 416/226 |
| 6,168,379 | B1 * | 1/2001 | Bauer | B64C 27/001 244/215 |
| 6,779,757 | B2 | 8/2004 | Thomas, Jr. | |
| 8,444,091 | B2 | 5/2013 | Balsa Gonzalez et al. | |
| 9,108,721 | B2 | 8/2015 | De Gregorio Hurtado et al. | |
| 9,120,564 | B1 | 9/2015 | White | |
| 2013/0299061 | A1 | 11/2013 | Rodman | |
| 2014/0339370 | A1 | 11/2014 | De Gregorio Hurtado et al. | |

FOREIGN PATENT DOCUMENTS

| | | |
|---|---|---|
| GB | 619694 | 3/1949 |
| WO | WO2014/070339 | 5/2014 |

OTHER PUBLICATIONS

European Patent Office, Extended European Search Report, EP 18 15 4371 (dated Apr. 4, 2018).
European Patent Office, "Communication pursuant to Article 94(3) EPC," App. No. 18 154 371.1 (dated May 21, 2019).

\* cited by examiner

*Primary Examiner* — Nicholas McFall
(74) *Attorney, Agent, or Firm* — Walters & Wasylyna LLC (57) ABSTRACT

An aerodynamic control surface including an upper panel having an upper panel aft end portion, a lower panel having a lower panel aft end portion, mechanical fasteners connecting the upper panel aft end portion to the lower panel aft end portion, and a fairing having a fairing forward end portion and a fairing aft end portion, wherein the fairing forward end portion is connected to either the upper panel or the lower panel, and wherein the fairing aft end portion is connected to the other of the upper panel or the lower panel.

20 Claims, 7 Drawing Sheets

AERODYNAMIC CONTROL SURFACE AND ASSOCIATED TRAILING EDGE CLOSE-OUT METHOD

FIELD

This application relates to aerodynamic control surfaces and, more particularly, to trailing edge close-out for aerodynamic control surfaces.

BACKGROUND

Aircraft, including fixed-wing aircraft and rotary-wing aircraft, employ a variety of aerodynamic control surfaces, such as ailerons, air brakes, elevators, flaps, rudders, slats, spoilers and the like. By manipulating one or more of the aerodynamic control surfaces, a pilot may control the lift generated by the aircraft, such as during takeoff, climbing, descending and landing, as well as the aircraft's orientation about its pitch, roll and yaw axes.

For example, the trailing edge of a wing of a fixed-wing aircraft typically includes one or more flaps, and the flaps are moveable between retracted and extended positions. At cruise, the flaps are typically maintained in a retracted position. When extended, the flaps increase the camber of the wing. Therefore, during takeoff, climbing, descending or landing, the flaps may be extended, either partially or fully, to increase the maximum lift coefficient and effectively reduce the stalling speed of the aircraft.

Aerodynamic control surfaces, such as flaps, have an aerodynamic cross-sectional profile that is typically formed by connecting an upper skin to a lower skin proximate both the leading edge and the trailing edge of the aerodynamic control surface. The leading edge of the aerodynamic control surface typically includes a bullnose. Therefore, connecting the upper skin to the lower skin proximate the leading edge is a relatively straightforward process. However, the trailing edge of the aerodynamic control surface is tapered to a thin cross-section, thereby complicating the process of connecting the upper skin to the lower skin proximate the trailing edge.

Accordingly, those skilled in the art continue with research and development efforts directed to trailing edge close-out for aerodynamic control surfaces.

SUMMARY

In one example, the disclosed aerodynamic control surface includes an upper panel having an upper panel aft end portion, a lower panel having a lower panel aft end portion, mechanical fasteners connecting the upper panel aft end portion to the lower panel aft end portion, and a fairing having a fairing forward end portion and a fairing aft end portion, wherein the fairing forward end portion is connected to either the upper panel or the lower panel, and wherein the fairing aft end portion is connected to the other of the upper panel or the lower panel.

In another example, the disclosed aerodynamic control surface includes an upper panel having an upper panel forward end portion and an upper panel aft end portion, wherein the upper panel is continuous from the upper panel forward end portion to the upper panel aft end portion, a lower panel having a lower panel forward end portion and a lower panel aft end portion, the lower panel aft end portion including a joggle, wherein the lower panel is continuous from the lower panel forward end portion to the lower panel aft end portion, a plurality of mechanical fasteners connecting the upper panel aft end portion to the lower panel aft end portion aft of the joggle, and a fairing having a fairing forward end portion and a fairing aft end portion, wherein the fairing forward end portion is connected to the lower panel forward of the joggle and the fairing aft end portion is connected to the upper panel.

In one example, the disclosed aerodynamic control surface trailing edge close-out method may include the steps of (1) forming a joggle in a lower panel aft end portion of a lower panel of the aerodynamic control surface; (2) connecting an upper panel aft end portion of an upper panel of the aerodynamic control surface to the lower panel aft end portion aft of the joggle; and (3) connecting a fairing such that the joggle is positioned between the fairing and the upper panel.

Other examples of the disclosed aerodynamic control surface and associated trailing edge close-out method will become apparent from the following detailed description, the accompanying drawings and the appended claims.

DETAILED DESCRIPTION

Figure 1:
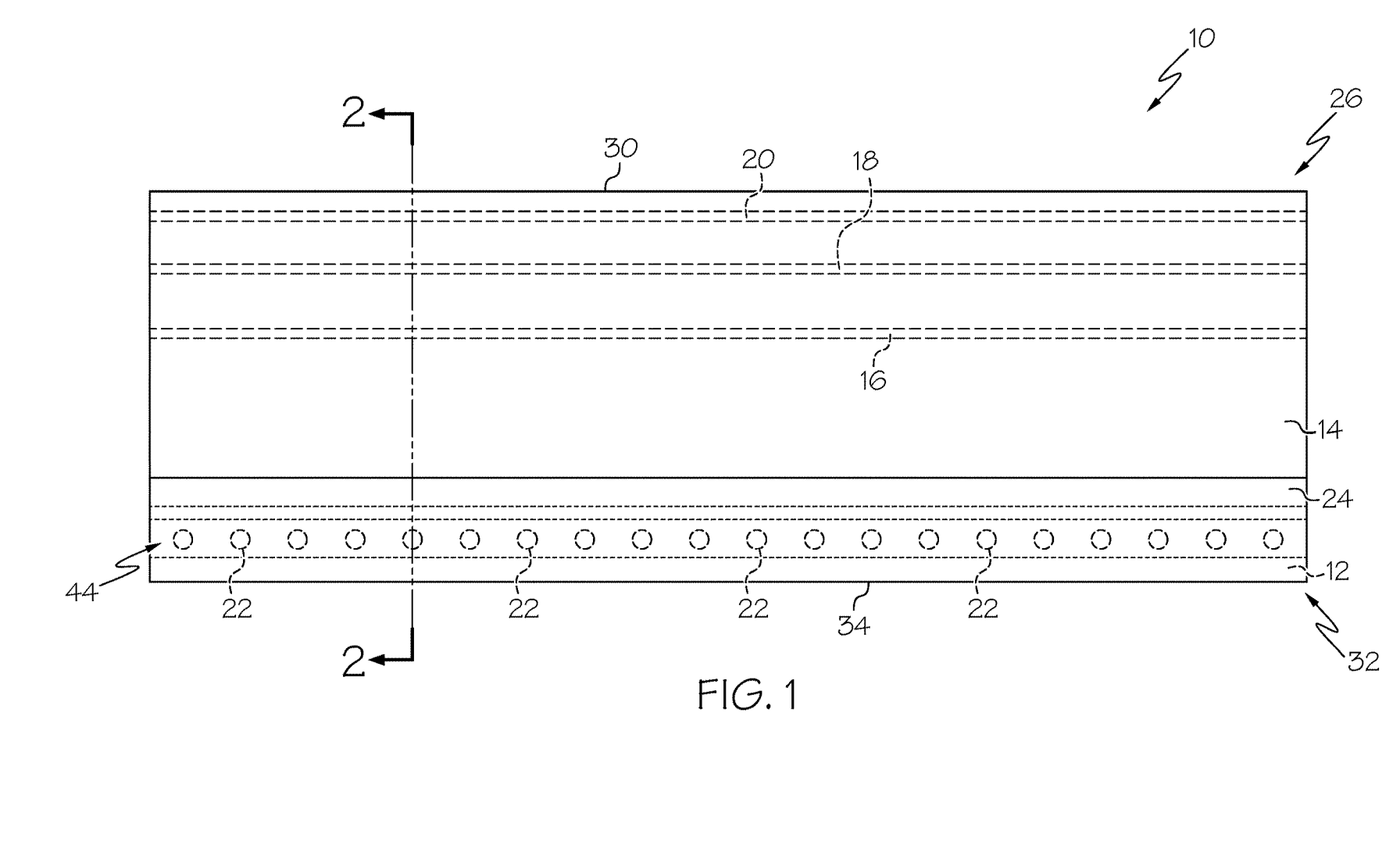
FIG. 1 is a bottom/underside plan view of one example of the disclosed aerodynamic control surface.
Figure 2:
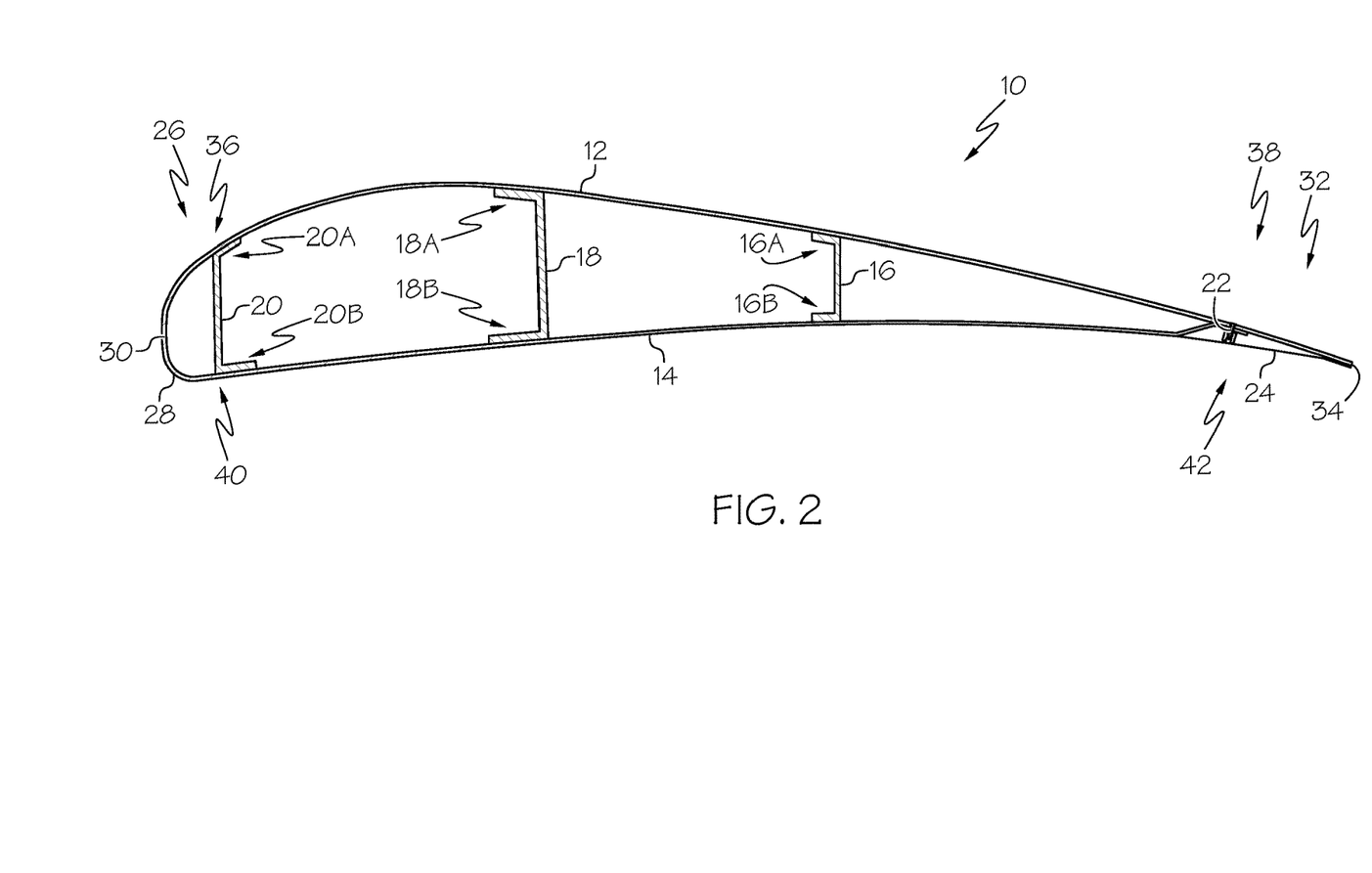
FIG. 2 is a cross-sectional view of the aerodynamic control surface of FIG. 1.

Referring to FIGS. 1 and 2, one example of the disclosed aerodynamic control surface, generally designated 10, includes an upper panel 12, a lower panel 14, one or more spars 16, 18, 20 (e.g., an aft spar 16, a mid spar 18 and a forward spar 20), a plurality of mechanical fasteners 22, and a fairing 24. The aerodynamic control surface 10 may include a forward end portion 26, which may include a bullnose 28 that defines the leading edge 30 of the aerodynamic control surface 10, and an aft end portion 32 that defines the trailing edge 34 of the aerodynamic control surface 10.

While the aerodynamic control surface 10 is shown and described as a flap, those skilled in the art will appreciate that the aerodynamic control surface 10 may assume various configurations, such as an aileron, an elevator, a rudder, a slat, a spoiler, an air brakes or the like, without departing from the scope of the present disclosure. A flap is only one specific, non-limiting example of the disclosed aerodynamic control surface 10.

As best shown in FIG. 2, the upper panel 12 of the aerodynamic control surface 10 includes an upper panel forward end portion 36 and an upper panel aft end portion 38 opposed from the upper panel forward end portion 36. The upper panel 12 may be continuous from the upper panel forward end portion 36 to the upper panel aft end portion 38.

The upper panel 12 may be connected to the spars 16, 18, 20, specifically, the upper panel 12 may be connected to the upper portion 16A of the aft spar 16, to the upper portion 18A of the mid spar 18, and to the upper portion 20A of the forward spar 20. The connections between the upper panel 12 and the spars 16, 18, 20 may be fixed connections, and may be made by mechanical fasteners, welds or the like, as is well known in the art.

The lower panel 14 of the aerodynamic control surface 10 includes a lower panel forward end portion 40 and a lower panel aft end portion 42 opposed from the lower panel forward end portion 40. The lower panel 14 may be continuous from the lower panel forward end portion 40 to the lower panel aft end portion 42. The lower panel 14 may be connected to the spars 16, 18, 20, specifically, the lower panel 14 may be connected to the lower portion 16B of the aft spar 16, to the lower portion 18B of the mid spar 18, and to the lower portion 20B of the forward spar 20. The connections between the lower panel 14 and the spars 16, 18, 20 may be fixed connections, and may be made by mechanical fasteners, welds or the like, as is well known in the art.

The upper panel forward end portion 36 of the upper panel 12 may be connected to the lower panel forward end portion 40 of the lower panel 14 proximate (at or near) the bullnose 28. In one construction, the upper panel forward end portion 36 may continuously transition into the lower panel forward end portion 40 proximate the bullnose 28. In another construction, the upper panel forward end portion 36 may be separate from the lower panel forward end portion 40, but joined to the lower panel forward end portion 40 at a seam (e.g., by mechanical fasteners, welds or the like).

The upper panel aft end portion 38 of the upper panel 12 may be connected to the lower panel aft end portion 42 of the lower panel 14 by way of the plurality (see FIG. 1) of mechanical fasteners 22. As shown in FIG. 1, the plurality of mechanical fasteners 22 may be arranged in a single row 44 that extends across the aft end portion 32 of the aerodynamic control surface 10. While the option to use only a single row of mechanical fasteners 22 may be attractive, using two or more rows of mechanical fasteners 22 is also contemplated and will not result in a departure from the scope of the present disclosure.

Figure 3:
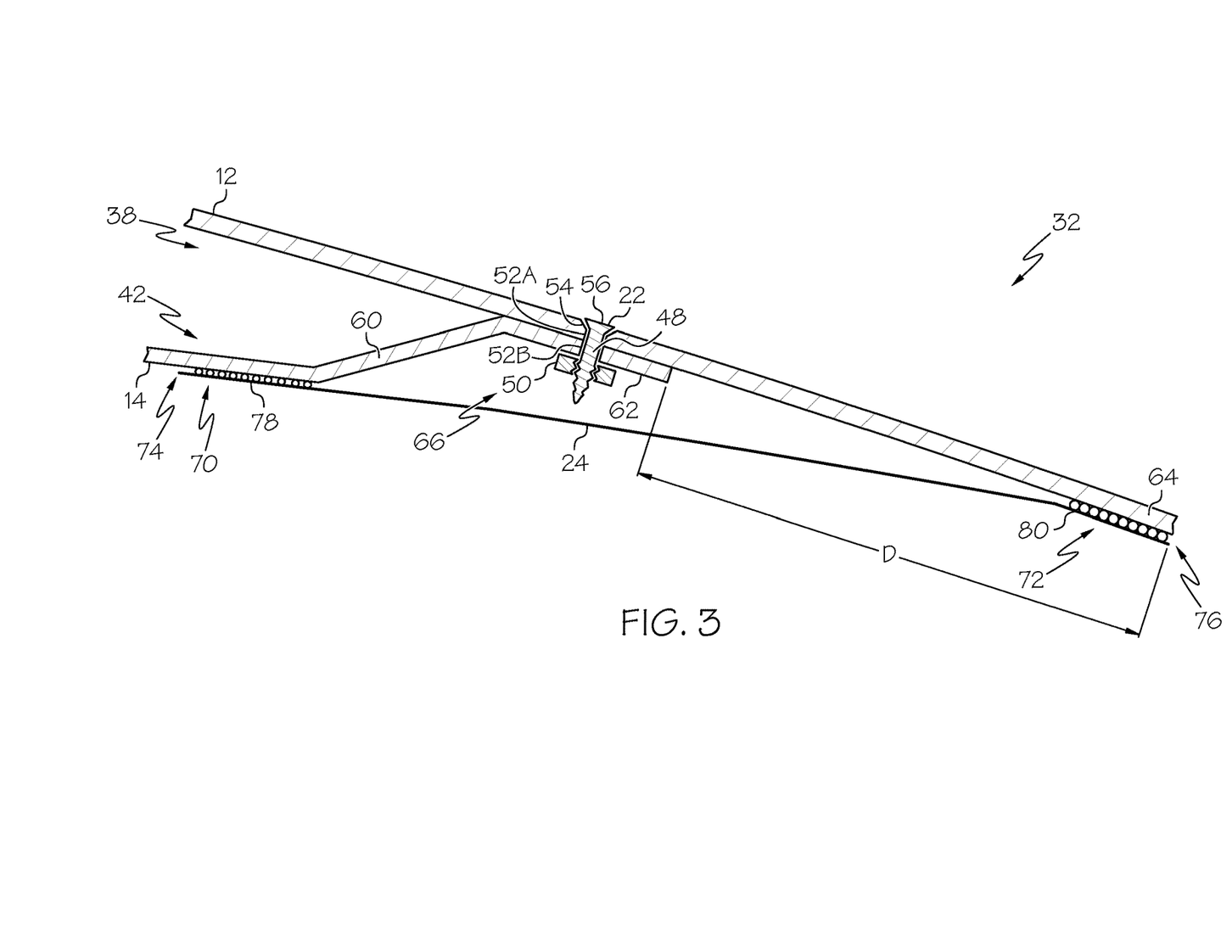
FIG. 3 is a detailed cross-sectional view of the aft end portion of the aerodynamic control surface of FIG. 2.

Various mechanical fasteners 22 may be used to connect the upper panel aft end portion 38 of the upper panel 12 to the lower panel aft end portion 42 of the lower panel 14. As one specific, non-limiting example, each mechanical fastener 22 may include a bolt member 48 and a nut member 50, as best shown in FIG. 3. The bolt member 48 may extend through aligned bores 52A, 52B in the upper and lower panels 12, 14, and may be in threaded engagement with the nut member 50. To maintain the smooth, aerodynamic profile of the upper panel 12, the bore 52A in the upper panel 12 may define a countersink 54, and the head 56 of the bolt member 48 may be seated in the countersink 54. The use of various other mechanical fasteners 22, such as screws, rivets and the like, is also contemplated.

Referring to FIG. 3, the lower panel aft end portion 42 of the lower panel 14 may include a joggle 60 formed therein. The joggle 60 may effect an approximation of the aft-most portion 62 of the lower panel aft end portion 42 of the lower panel 14 with the upper panel aft end portion 38 of the upper panel 12, thereby facilitating connection with the mechanical fasteners 22. The joggle 60 may also effect a displacement (by distance D) of the aft-most portion 62 of the lower panel aft end portion 42 of the lower panel 14 with the aft-most portion 64 of the upper panel aft end portion 38 of the upper panel 12.

The fairing 24 may be connected to the aft end portion 32 of the aerodynamic control surface 10 such that the joggle 60 is positioned between the fairing 24 and the upper panel 12, thereby defining a volume 66 between the fairing 24, the upper panel 12 and the lower panel 14. The nut members 50 of the mechanical fasteners 22 may be received in the volume 66, while the bolt members 48 of the mechanical fasteners 22 may protrude into the volume to threadingly engage the nut members 50.

The fairing 24 includes a fairing forward end portion 70 and a fairing aft end portion 72 opposed from the fairing forward end portion 70. The fairing forward end portion 70 of the fairing 24 may be connected to the lower panel aft end portion 42 of the lower panel 14 at a first lap joint 74. The first lap joint 74 may be forward of the joggle 60 such that the joggle 60 is positioned between the row 44 (FIG. 1) of mechanical fasteners 22 and the first lap joint 74. The fairing aft end portion 72 of the fairing 24 may be connected to the upper panel aft end portion 38 of the upper panel 12 at a second lap joint 76.

Various techniques may be used to connect the fairing forward end portion 70 to the lower panel 14 at the first lap joint 74 and the fairing aft end portion 72 to the upper panel 12 at the second lap joint 76. For example, an adhesive, such as a thermosetting polymer (e.g., an epoxy resin system), may be used to make the connections at the first lap joint 74 and the second lap joint 76. Specifically, a first portion 78 of adhesive may be applied between the fairing forward end portion 70 and the lower panel 14 at the first lap joint 74, while a second portion 80 of adhesive may be applied between the fairing aft end portion 72 and the upper panel 12 at the second lap joint 76.

Thus, despite the joggle 60 in the lower panel 14 and the protruding mechanical fasteners 22, the fairing 24 maintains the desired aerodynamic profile of the aft end portion 32 of the aerodynamic control surface 10.

While the aerodynamic control surface 10 is shown and described having a joggle 60 in the lower panel 14 such that the fairing forward end portion 70 is connected to the lower panel 14 and the fairing aft end portion 72 is connected to the upper panel 12, other configurations are also contemplated. For example, the joggle 60 may be formed in the upper panel 12 such that the fairing forward end portion 70 is connected to the upper panel 12 and the fairing aft end portion 72 is connected to the lower panel 14.

Figure 4:
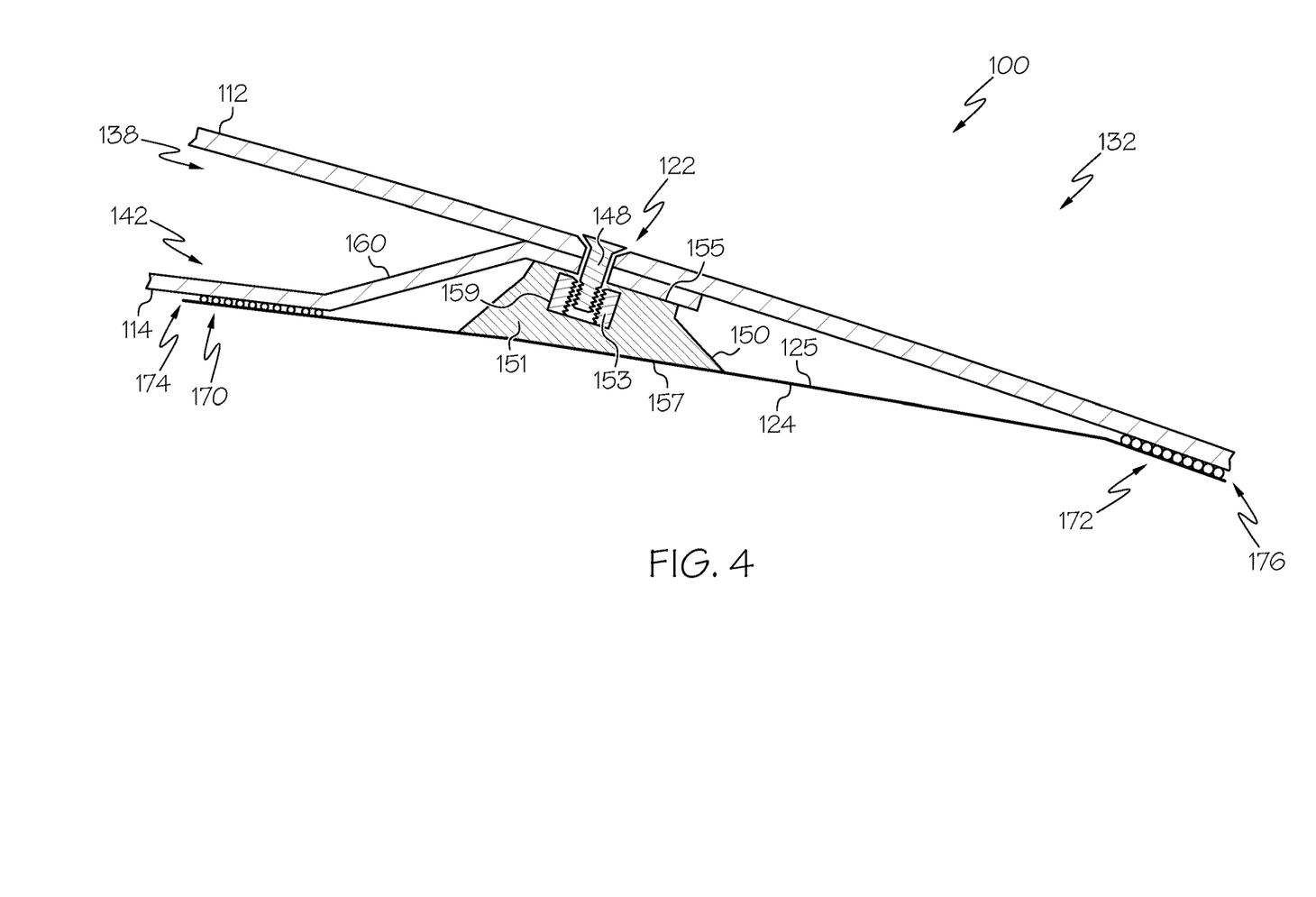
FIG. 4 is a cross-sectional view of the aft end portion of another example of the disclosed aerodynamic control surface.

Referring to FIG. 4, another example of the disclosed aerodynamic control surface, generally designated 100, includes an upper panel 112, a lower panel 114, one or more spars (not shown in FIG. 4), a plurality of mechanical fasteners 122 (only one mechanical fastener 122 shown in FIG. 4), and a fairing 124. An upper panel aft end portion 138 of the upper panel 112 may be connected to a lower panel aft end portion 142 of the lower panel 114 by way of the mechanical fasteners 122. The connection (mechanical fasteners 122) may be made aft of a joggle 160 formed in the lower panel aft end portion 142.

The aerodynamic control surface 100 of FIG. 4 may be the same as (or similar to) the aerodynamic control surface 10 shown in FIG. 3, with the exception that the mechanical fasteners 122 of the aerodynamic control surface 100 contribute to connecting the fairing 124 to the aft end portion 132 of the aerodynamic control surface 100. Specifically, each mechanical fastener 122 of the aerodynamic control surface 100 includes a bolt member 148 engaged with a nut member 150, wherein the nut member 150 is connected to the fairing 124.

Figure 5:
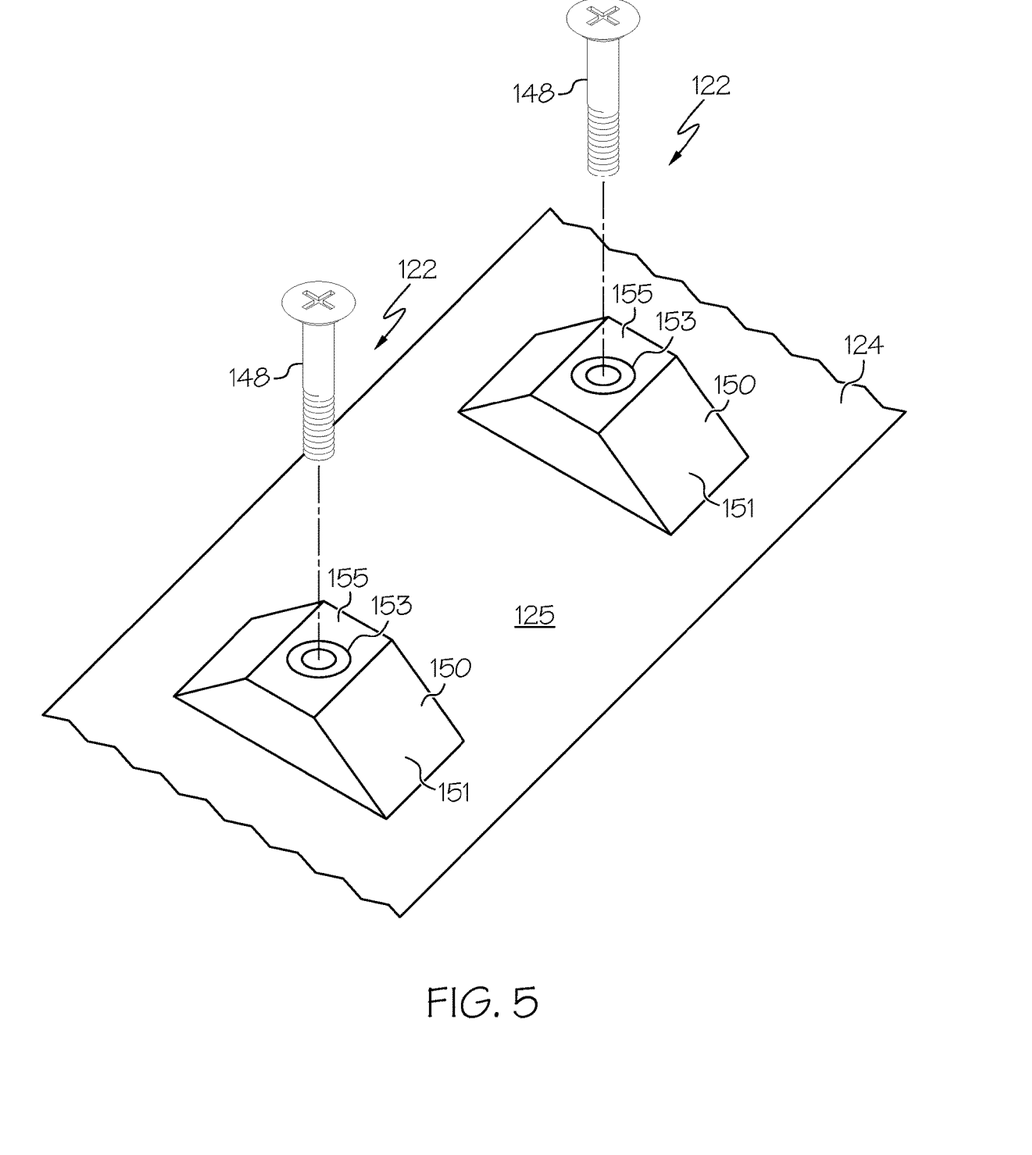
FIG. 5 is a perspective view of a portion of a fairing of the aerodynamic control surface of FIG. 4.

Referring to FIGS. 4 and 5, in one particular construction, each nut member 150 may include a body 151 and a threaded insert 153. The body 151 of the nut member 150 may include a first mating surface 155 and a second mating surface 157 opposed from the first mating surface 155. A recess 159 may be formed in the first mating surface 155 of the body 151, and the threaded insert 153 may be fixedly received in the recess 159. The second mating surface 157 of the body 151 may be fixedly connected to the inner surface 125 of the fairing 124, such as with an adhesive (e.g., a thermosetting polymer, such as an epoxy resin system).

Accordingly, as the bolt members 148 are threaded into engagement with the threaded inserts 153 of the nut members 150, the fairing 124, which is connected to the nut members 150, becomes attached to the aft end portion 132 of the aerodynamic control surface 100. The fairing 124 may further be secured to the aft end portion 132 of the aerodynamic control surface 100 by connecting a fairing forward end portion 170 of the fairing 124 to the lower panel aft end portion 142 of the lower panel 114 at a first lap joint 174 and connecting a fairing aft end portion 172 of the fairing 124 to the upper panel aft end portion 138 of the upper panel 112 at a second lap joint 176.

Figure 6:
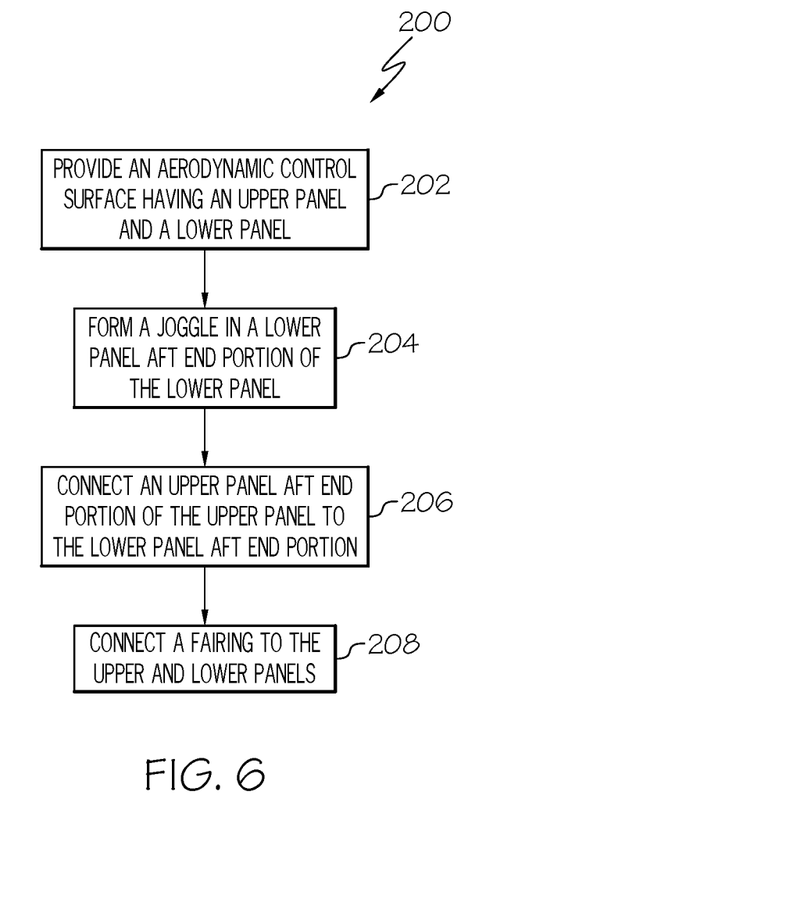
FIG. 6 is a flow diagram depicting one example of the disclosed aerodynamic control surface trailing edge close-out method.

Also disclosed is a method for closing-out a trailing edge of an aerodynamic control surface. Referring to FIG. 6, one example of the disclosed trailing edge close-out method, generally designated 200, may begin at Block 202 with the step of providing an aerodynamic control surface having an upper panel and a lower panel, wherein the upper panel includes an upper panel aft end portion and the lower panel includes a lower panel aft end portion.

At Block 204, a joggle may be formed in the lower panel aft end portion. The joggle may effect an approximation of the aft-most portion of the lower panel aft end portion of the lower panel with the upper panel aft end portion of the upper panel. The joggle may also effect a displacement of the aft-most portion of the lower panel aft end portion of the lower panel with the aft-most portion of the upper panel aft end portion of the upper panel.

At Block 206, the upper panel aft end portion may be connected to the lower panel aft end portion aft of the joggle. The connection between the upper panel aft end portion and the lower panel aft end portion may be made with mechanical fasteners.

At Block 208, a fairing may be connected such that the joggle is positioned between the fairing and the upper panel. In one expression, the fairing may be connected by applying a first portion of adhesive between a fairing forward end portion of the fairing and the lower panel and a second portion of adhesive between a fairing aft end portion of the fairing and the upper panel. In another expression, the fairing may be connected simultaneously with the step (Block 206) of connecting the upper panel aft end portion to the lower panel aft end portion.

Figure 7:
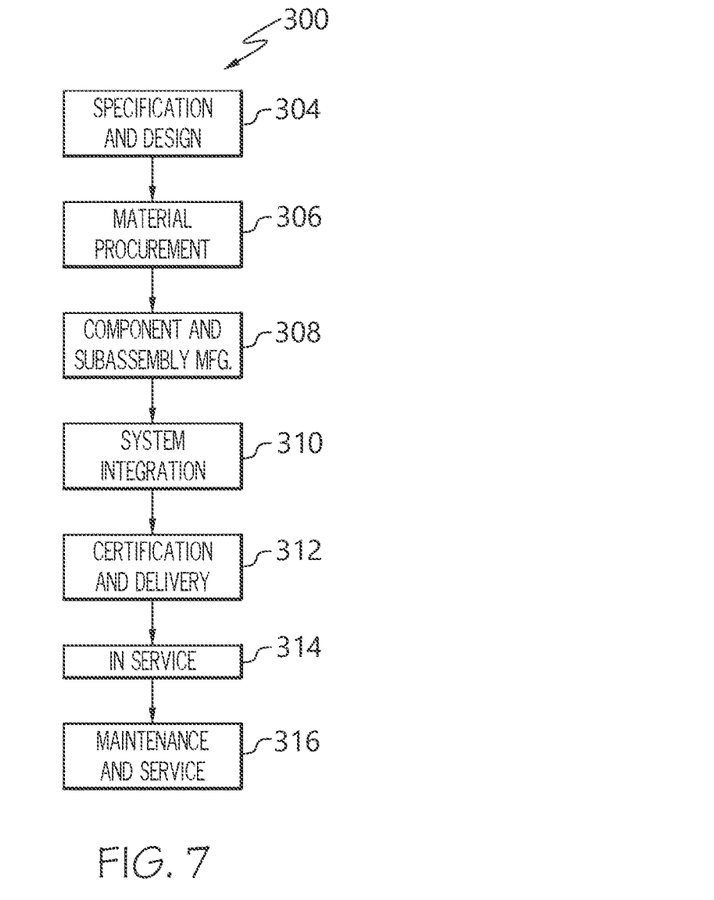
FIG. 7 is flow diagram of an aircraft manufacturing and service methodology.
Figure 8:
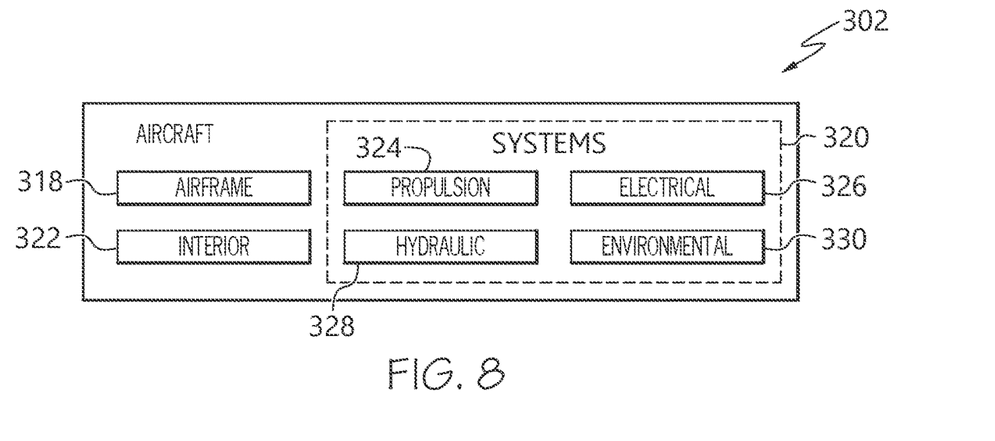
FIG. 8 is a block diagram of an aircraft.

Examples of the disclosure may be described in the context of an aircraft manufacturing and service method 300, as shown in FIG. 7, and an aircraft 302, as shown in FIG. 8. During pre-production, the aircraft manufacturing and service method 300 may include specification and design 304 of the aircraft 302 and material procurement 306. During production, component/subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316, which may also include modification, reconfiguration, refurbishment and the like.

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 302 produced by example method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included.

The disclosed aerodynamic control surface and associated trailing edge close-out method may be employed during any one or more of the stages of the aircraft manufacturing and service method 300. For example, components or subassemblies corresponding to component/subassembly manufacturing 308, system integration 310, and or maintenance and service 316 may be fabricated or manufactured using the disclosed aerodynamic control surface and associated trailing edge close-out method. Also, one or more apparatus examples, method examples, or a combination thereof may be utilized during component/subassembly manufacturing 308 and/or system integration 310, for example, by substantially expediting assembly of or reducing the cost of an aircraft 302, such as the airframe 318 and/or the interior 322. Similarly, one or more of system examples, method examples, or a combination thereof may be utilized while the aircraft 302 is in service, for example and without limitation, to maintenance and service 316.

The disclosed system and method are described in the context of an aircraft; however, one of ordinary skill in the art will readily recognize that the disclosed system and method may be utilized for a variety of different components for a variety of different types of vehicles. For example, implementations of the examples described herein may be implemented in any type of vehicle including, e.g., helicopters, passenger ships, automobiles and the like.

Although various examples of the disclosed aerodynamic control surface and associated trailing edge close-out method have been shown and described, modifications may occur to those skilled in the art upon reading the specification. The present application includes such modifications and is limited only by the scope of the claims.

What is claimed is:

1. An aerodynamic control surface comprising:
   an upper panel comprising an upper panel aft end portion comprising an upper panel interior surface;
   a lower panel comprising a lower panel aft end portion comprising a lower panel interior surface opposed from said upper panel interior surface;
   a plurality of mechanical fasteners extending through both said upper panel aft end portion and said lower panel aft end portion to connect said upper panel aft end portion to said lower panel aft end portion such that a portion of said upper panel interior surface abuts a portion of said lower panel interior surface; and
   a fairing having a fairing forward end portion and a fairing aft end portion, wherein said fairing forward end portion is connected to one of said upper panel and said lower panel, and wherein said fairing aft end portion is connected to the other of said upper panel and said lower panel.

2. The aerodynamic control surface of claim 1 wherein said upper panel further comprises an upper panel forward end portion, and wherein said upper panel is continuous from said upper panel forward end portion to said upper panel aft end portion.

3. The aerodynamic control surface of claim 2 wherein said lower panel further comprises a lower panel forward end portion, and wherein said lower panel is continuous from said lower panel forward end portion to said lower panel aft end portion.

4. The aerodynamic control surface of claim 3 wherein said upper panel forward end portion is connected to said lower panel forward end portion at a bullnose.

5. The aerodynamic control surface of claim 1 wherein said plurality of mechanical fasteners are arranged in a single row.

6. The aerodynamic control surface of claim 1 wherein a volume is defined between said fairing, said upper panel and said lower panel, and wherein said plurality of mechanical fasteners protrude into said volume.

7. The aerodynamic control surface of claim 6 wherein each mechanical fastener of said plurality of mechanical fasteners comprises a nut member and a bolt member, and wherein said nut member is received in said volume.

8. The aerodynamic control surface of claim 7 wherein said nut member is connected to said fairing.

9. The aerodynamic control surface of claim 8 wherein said nut member comprises a body and a threaded insert received in said body, and wherein said body of said nut member is fixedly connected to said fairing.

10. The aerodynamic control surface of claim 1 wherein said fairing forward end portion is connected to said lower panel and said fairing aft end portion is connected to said upper panel.

11. The aerodynamic control surface of claim 10 wherein a first portion of adhesive connects said fairing forward end portion to said lower panel and a second portion of said adhesive connects said fairing aft end portion to said upper panel.

12. The aerodynamic control surface of claim 11 wherein said adhesive comprises a thermosetting polymer.

13. The aerodynamic control surface of claim 10 wherein said lower panel further comprises a joggle.

14. The aerodynamic control surface of claim 13 wherein said fairing forward end portion is connected to said lower panel at a first lap joint, and wherein said joggle is positioned between said first lap joint and said plurality of mechanical fasteners.

15. The aerodynamic control surface of claim 1 further comprising an aft spar connected to both said upper panel and said lower panel.

16. An aerodynamic control surface comprising:
    an upper panel comprising an upper panel forward end portion and an upper panel aft end portion, wherein said upper panel is continuous from said upper panel forward end portion to said upper panel aft end portion;
    a lower panel comprising a lower panel forward end portion and a lower panel aft end portion, said lower panel aft end portion comprising a joggle, wherein said lower panel is continuous from said lower panel forward end portion to said lower panel aft end portion;
    a plurality of mechanical fasteners connecting said upper panel aft end portion to said lower panel aft end portion aft of said joggle; and
    a fairing having a fairing forward end portion and a fairing aft end portion, wherein said fairing forward end portion is connected to said lower panel forward of said joggle and said fairing aft end portion is connected to said upper panel.

17. A method for closing-out a trailing edge of an aerodynamic control surface, said aerodynamic control surface comprising an upper panel having an upper panel aft end portion and a lower panel having a lower panel aft end portion, said method comprising:
    forming a joggle in said lower panel aft end portion;
    connecting said upper panel aft end portion to said lower panel aft end portion aft of said joggle; and
    connecting a fairing such that said joggle is positioned between said fairing and said upper panel.

18. The method of claim 17 wherein said connecting said upper panel aft end portion to said lower panel aft end portion comprises applying mechanical fasteners.

19. The method of claim 17 wherein said connecting said fairing comprises applying a first portion of adhesive between a fairing forward end portion of said fairing and said lower panel and a second portion of said adhesive between a fairing aft end portion of said fairing and said upper panel.

20. The method of claim 17 wherein said connecting said fairing is performed simultaneously with said connecting said upper panel aft end portion to said lower panel aft end portion.

* * * * *